United States Patent [19]

Kato et al.

[11] Patent Number: 4,560,861
[45] Date of Patent: Dec. 24, 1985

[54] CONDITION REGULATING DEVICE FOR THE METERS FOR MEASURING THE QUANTITY OF MOTION

[75] Inventors: Yasuji Kato; Hiroyuki Kobayashi, both of Kanagawa; Yukio Yamamoto, Tokyo, all of Japan

[73] Assignee: Yamasa Tokei Meter Co., Ltd., Japan

[21] Appl. No.: 654,230

[22] Filed: Sep. 25, 1984

[30] Foreign Application Priority Data

Mar. 15, 1984 [JP] Japan .............................. 59-37151[U]

[51] Int. Cl.⁴ ............................................. G01C 22/00
[52] U.S. Cl. .................................................. 235/105
[58] Field of Search .............................. 235/105, 95 C

[56] References Cited

U.S. PATENT DOCUMENTS 4,322,609 3/1982 Kato ..................................... 235/105
4,460,823 7/1984 Ruehlemann ....................... 235/105

Primary Examiner—Benjamin R. Fuller
Attorney, Agent, or Firm—Cantor and Lessler

[57] ABSTRACT

A condition regulating device for meters for measuring the quantity of motion which have a sensor including a pendulum for sensing vibrations, and components for transmitting the swinging of the pendulum to a display for displaying the swinging of the pendulum as a function of the quantity of motion. The device includes an externally threaded regulating shaft having both its ends rotatably supported on a frame, a movable member designed to be in engagement with the external thread of the shaft and reciprocate axially in association with the rotation of the shaft, a lower limit stopper for the pendulum, which is integral with the movable member, a buffer lever rotatably mounted on the frame, which is designed such that, when the acceleration acting upon the pendulum exceeds a certain value, it buffers the swinging of the pendulum and the other end secured to the other end of the buffer lever.

1 Claim, 12 Drawing Figures

4,560,861

CONDITION REGULATING DEVICE FOR THE METERS FOR MEASURING THE QUANTITY OF MOTION

FIELD OF THE INVENTION

The present invention relates to a device for determining the measurement condition for various meters for measuring the quantity of motion such as pedometers, mileage meters and energy meters, each being adapted to be attached to the waist of a user and including a pendulum for sensing vibrations accompanied by motion.

BACKGROUND OF THE INVENTION

The prior art meters for measuring the quantity of motion comprising sensor means attached to the waist of a user and having a pendulum for sensing vibrations accompanied by motion such as walking or running, transmission means for transmitting the swings of the pendulum to display means, and display means for displaying the swings of the pendulum as the quantity of motion includes pedometers for displaying the swings of the pendulum as the number of steps, mileage meters for calculating the number of steps in terms of mileage, and energy meters for determining the quantity of motion (cal) as the product of the length of time and the intensity of motion (cal/min) that is an energy consumption per unit time. However, these meters have needed a certain type of device for regulating the measurement condition for the following reasons.

Actual measurement has revealed that the speed of walking or running is in proportion to the acceleration acting upon the waist of a user, as shown by broken lines A and B in FIG. 1, and this relation also holds for the case of a straight line C obtained by synthesis of the lines A and B.

FIG. 2 shows the relations between the speeds of walking, walking on an upward slope and running and the energy consumptions (cal/min) thereof in terms of straight lines D, E and F, FIG. 3 shows the relation between the acceleration acting upon the waist and the energy consumption per Kg of weight (cal/Kg/min) in terms of a straight line G, and FIG. 4 shows the relation between the acceleration acting upon the waist and the energy consumption (cal/Kg/step) per step on level and in terms of a straight line H. As will be appreciated from these figures, the energy consumption is in proportion to the speed of motion, and the energy consumption per step varies depending upon sex, age, weight and height.

In the meters for measuring the quantity of motion, which include a pendulum for sensing vibrations accompanied by the motion of a user, it is required for the aforesaid reasons to regulate the sensitivity of the pendulum depending upon various conditions such as the type of motion, the sex of the user, etc. For instance, the applicant already filed Japanese Utility Model Application No. 58-142900 for a condition regulating device for meters for measuring the quantity of motion, wherein the sensitivity of a pendulum is adjustable depending upon various conditions.

That device is characterized by including an externally threaded regulating shaft having both its ends rotatably supported on a frame, a movable member designed to be in threaded engagement with the external thread of said shaft and reciprocate axially in association with the rotation of said shaft, a lower limit stopper for a pendulum, which is united with said movable member, an adjusting lever mounted on said frame, which has one end engaged with said movable member and rotates in association with the reciprocation of said movable member on said regulating shaft, and a loop-like spring having one end secured to said pendulum and the other end secured to the other end of said adjusting lever.

As already mentioned, during motion, the acceleration and the energy consumption are in proportion to the speed. Now let us assume that this relation and the stride are proportionate to the speed. The magnitude of the quantity of motion is then determined by the lower limit stopper depending upon the conditions relating to a user, the type of motion such as walking, running, etc. Subsequently, the predetermined quantity of deflection is applied through the adjusting lever on the spring, whose spring properties show the relation between the amount of deflection of the spring and the spring load, and satisfies direct proportion, as shown by a straight line I in FIG. 5, whereby the quantity of amplitude of the pendulum is balanced with respect to the spring load depending upon various states of motion.

However, actual measurement has indicated that the relation between the speed and the stride during motion is expressed in the form of a substantial parabola, as shown by a curve J in FIG. 6. Thus, the assumption that the stride is in proportion to the speed leads to overestimation of the speed relative to the stride, making the calculated energy value larger than the actual value. With this device, it receives increased acceleration during running, so that the pendulum collides with the lower limit stopper to produce irregular vibrations. Such vibrations are in turn transmitted to display means as noises detrimental to accurate determination of the quantity of motion.

SUMMARY OF THE INVENTION

In view of the foregoing, the present invention has for its main object to provide a condition regulating device for meters for measuring the quantity of motion, which can regulate pace depending upon a stride to accommodate to a wider range of conditions relating to a user or the type of motion, and prevent irregular swinging of the pendulum to increase further the accuracy of measurement.

According to the present invention, this object is achieved by the provision of a condition regulating device for meters for measuring the quantity of motion, which comprise sensor means including a pendulum for sensing vibrations, and transmission means for transmitting the swinging of said pendulum to display means for displaying the swinging of said pendulum as the quantity of motion, said device being characterized by including an externally threaded regulating shaft having both its ends rotatably supported on a frame, a movable member designed to be in engagement with the external thread of said shaft and reciprocate axially in association with the rotation of said shaft, a lower limit stopper for said pendulum, which is united with said movable member, a buffer lever rotatably mounted on said frame, which is designed such that, when the acceleration acting upon said pendulum exceeds a certain value, it buffers the swinging of said pendulum at its one end, and a loop-like spring having one end secured to said pendulum and the other end secured to the other end of said buffer lever.

In what follows, one embodiment in which the present invention is applied to a pedometer will be described in detail with reference to FIGS. 7–12 inclusive.

DETAILED DESCRIPTION OF THE INVENTION

The illustrated pedometer comprises a casing, generally shown at 1, including therein sensor means 2 for sensing vibrations produced by the motion of a user such as walking or running, transmission means 3 for transmitting such vibrations to display means 4 which displays mileage, and condition regulating means 5 for the sensor means 2.

Figure 9:
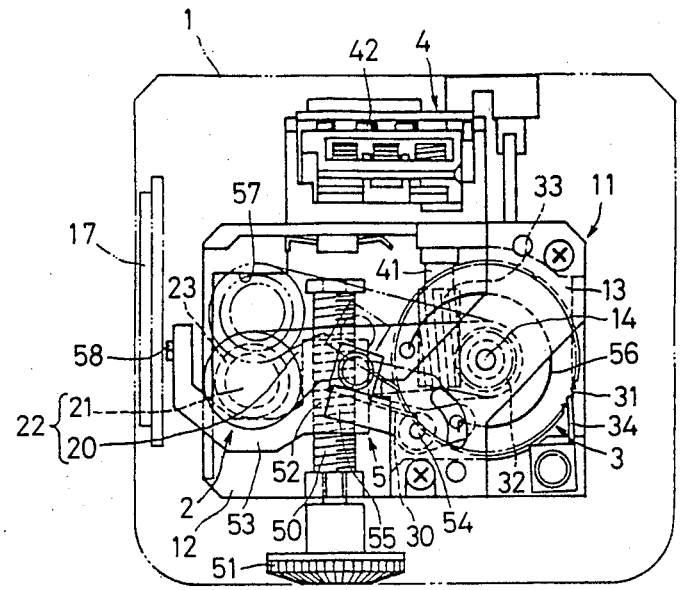
FIG. 9 is a front view showing the internal mechanism of the pedometer of the present invention wherein the buffer lever is not in operation.
Figure 10:
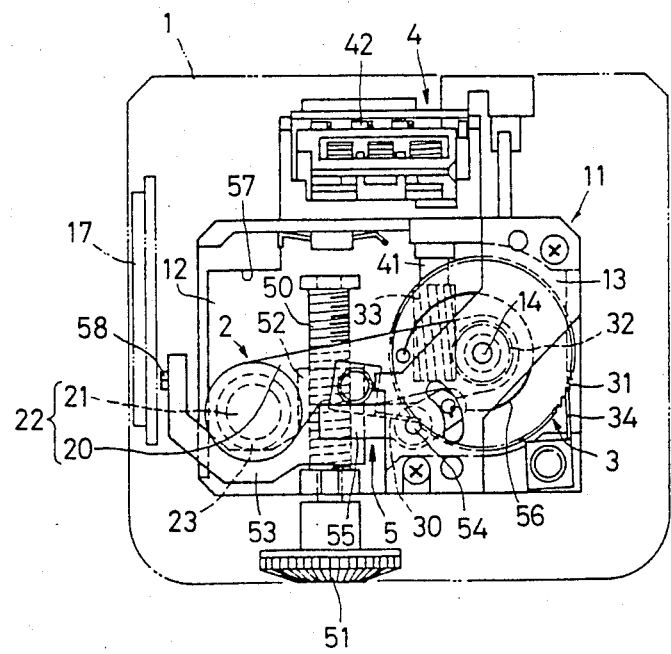
FIGS. 10–12 are front, left-side and right-side views showing the internal mechanism of the pedometer of the present invention, wherein the buffer lever is in operation.
Figure 11:
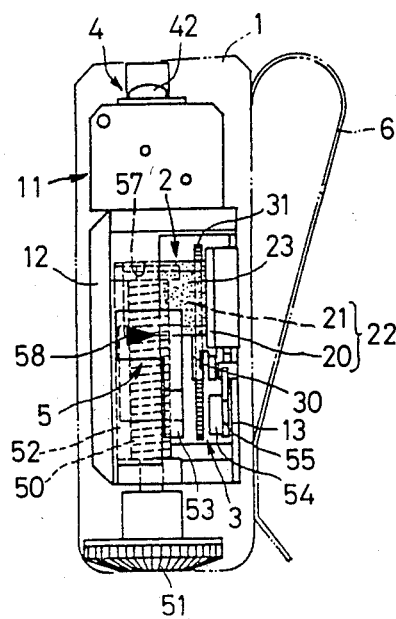
Figure 12:
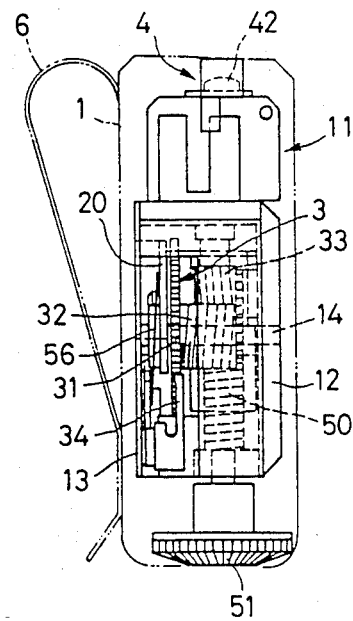

As shown in FIGS. 9 and 10, the sensor means 2 includes pendulum means 22 comprising an arm 20 having one end rotatably mounted on a support shaft 14 disposed through plates 12 and 13 of a frame 11, and a weight 21 is provided therearound with a shock absorber 23 formed of rubber, etc.

The transmission means 3 includes a feed pawl 30 fixed to the arm 20 of the means 22, a rachet gear 31 rotatably supported on the support shaft 14 and rotatable by the feed pawl 30, a worm gear 32 mounted integrally with the rachet gear 31, a worm 33 engageable with the worm gear 32 and mounted on a transmission shaft 41 of the display means 4, and a second pawl 34 mounted on the frame 11 for preventing the reversal of the rachet gear 31.

The display means 4 for digitally displaying mileage includes a digital counter 42 designed to digitally display the quantity of rotation transmitted by the worm 33 through the transmission shaft 41.

The condition regulating means 5 comprises an externally threaded regulating shaft 50 having both its ends rotatably mounted on the first plate 12 of the frame 11, a finger grip 51 fixed to the lower end of the regulating shaft 50 for turning the regulating shaft 50 from the outside of the casing 1, a movable member 52 threadedly engageable with the external thread of the regulating shaft 50 and capable of reciprocating axially in response to the rotation of said shaft 50, a lower limit stopper 53 for the pendulum, which is mounted integrally on the movable member 52, a buffer lever 55 rotatably journalled on the second plate 13 of the frame 11 by means of a pin 54, a loop-like spring 56 having one end secured to the arm 20 of the pendulum 22 and the other end secured to the other end of the lever 55, an upper limit stopper 57 for the pendulum 22, which is located at the upper portion of the frame 11, and a sensitivity display mark 58 mounted on the extremity of the lower limit stopper 53.

Figure 1:
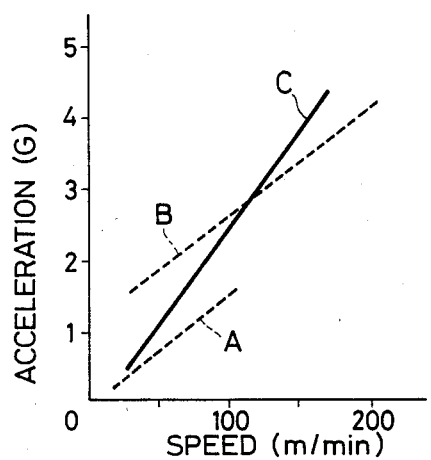
FIG. 1 is a diagram showing proportional relation of speed with acceleration.
Figure 2:
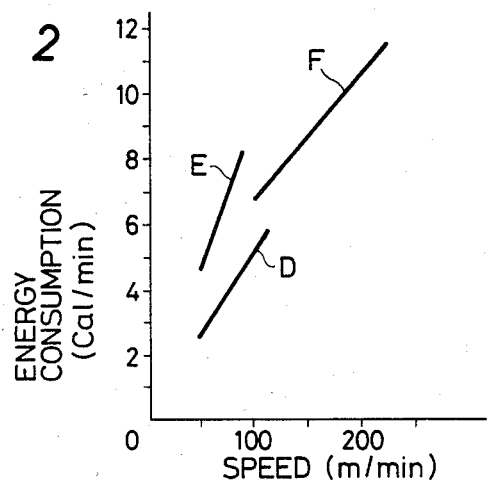
FIG. 2 is a diagram showing relation of speed of walking and running with energy consumptions.
Figure 3:
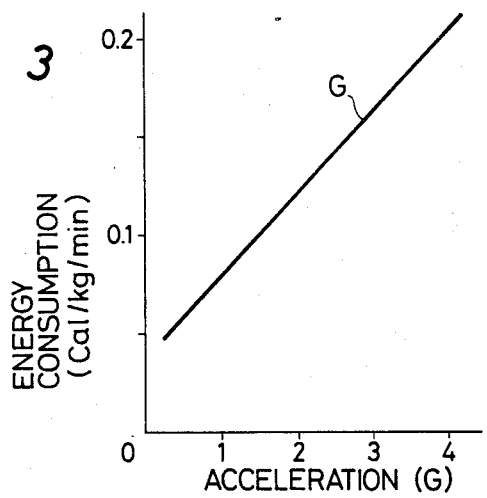
FIG. 3 is a diagram showing relation of the acceleration acting upon the waist with energy consumption per Kg. of weight.
Figure 4:
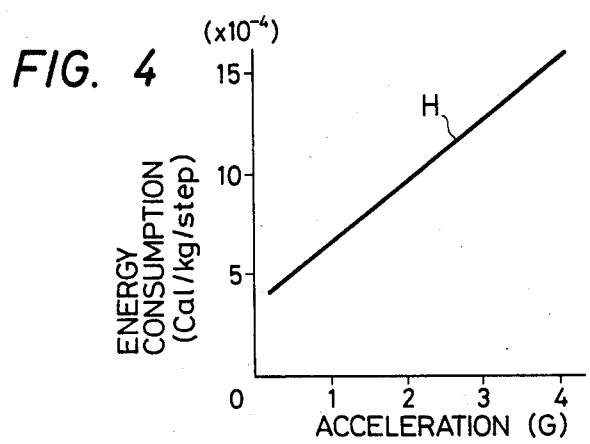
FIG. 4 is a diagram showing relation of the acceleration acting upon the waist with energy consumption per step on level.

Now let us assume that the critical value of acceleration for discriminating walking from running is calculated to be 1.5 G from FIG. 1, and the spacing between the lower and upper limit stoppers 53 and 57 is determined in respect of the given position of the lower limit stopper 53 corresponding to that value. When the acceleration exceeds 1.5 G, the buffer lever 55 receive at the upper portion of the other end thereof, so that the lever 55 turns to buffer the swinging of the pendulum 22 through the spring 56. It is noted that it is possible to optimally determine the distances from the fulcrum to both ends of the buffer lever 55 to provide an enlarged mechanism, whereby various spring loads may be applied to the spring 56.

Figure 6:
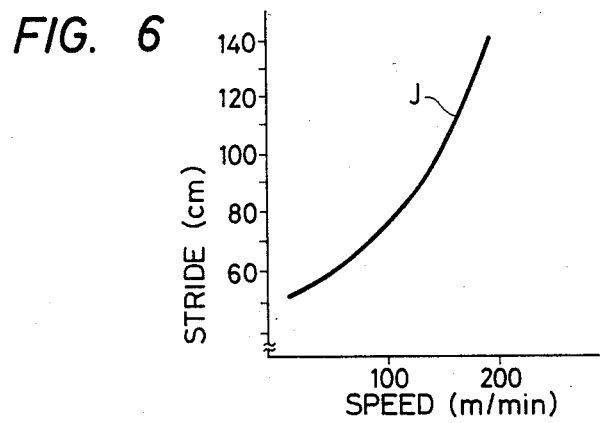
FIG. 6 is a diagram showing relation of speed with stride.
Figure 7:
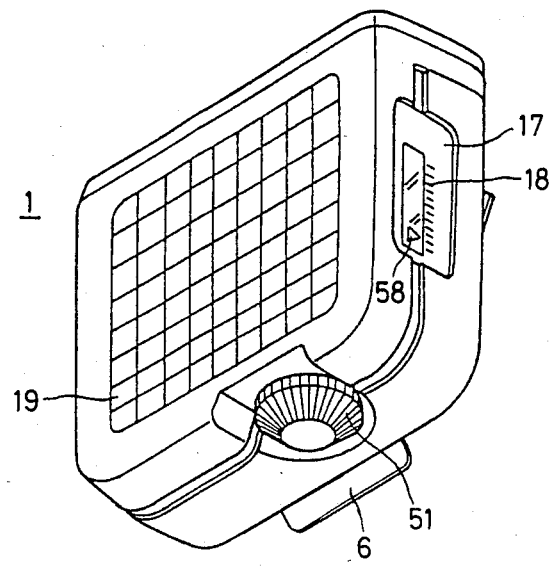
FIG. 7 is a perspective front view showing the pedometer of the present invention.
Figure 8:
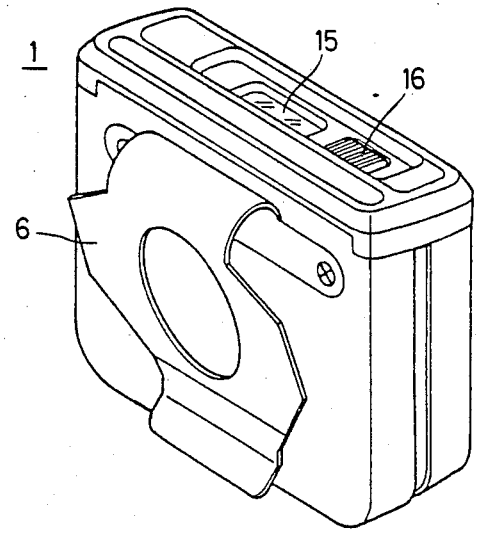
FIG. 8 is a perspective rear view showing the pedometer of the present invention.

The casing 1 is provided with a window 15 corresponding to the dispay portion of the display means 4 and a reset button 16 on the upper face, with a display window 17 for the mark 58 and a step scale 18 on one side, and with the grip 51 on the lower face. The casing 1 is also provided on the front face with a condition table 19 corresponding to the step scale 18, said condition table being used by a user as an index for the sensitivity to be selected, taking into account the curve J of FIG. 6 showing the relation between the stride and the speed. Furthermore, the casing 1 is provided on the rear side with a fitting 6 to be inserted through the waist band of a user or the like.

To use the thus assembled pedometer, a specific condition is first selected from the condition table 19 provided on the front face of the casing 1 depending upon, for instance, the type of motion. The regulating shaft 50 is then turned by means of the grip 51 to align the mark 58 with the selected step scale 18.

Figure 5:
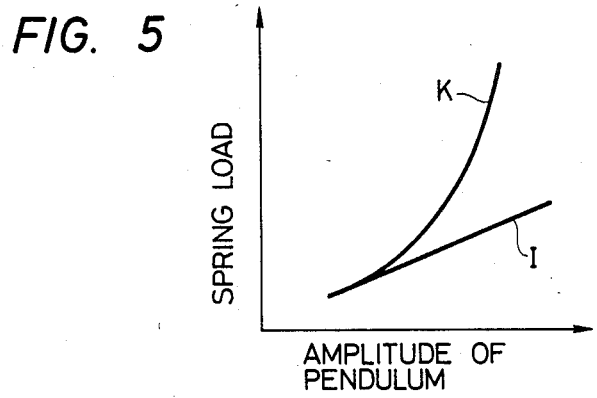
FIG. 5 is a diagram showing spring property in relation of amplitude of pendulum with spring load.

The movable member 52 then moves upwardly or downwardly on the regulating shaft 50 to adjust the space between the upper and lower limit stoppers 57 and 53. Referring to the relation between the position of the lower limit stopper 56 and the amount of deflection of the spring 53, when the acceleration is lower than 1.5 G, and the lower limit stopper is located above the given position, the amount of deflection of the spring 56 is in proportion to the spring load. On the other hand, when the lower limit stopper 53 is located below the given position, and the acceleration is larger than 1.5 G, the amount of deflection of the spring 56 increases, since the arm 20 abuts against the upper end of the buffer lever 55, so that the spring load increases to buffer the swinging of the pendulum 22. This prevents the pendulum 22 from swinging irregularly to reduce or eliminate noises transmitted to the display means 4, whereby the sensitivity of the pendulum 22 is regulated with high accuracy, and automatic switchover from walking to running and vice versa is achieved depending upon a stride. Even when the pendulum 22 may abut against the buffer lever 55 or the lower or upper limit stopper 57 or 53, the shock absorber 23 of the weight 21 serves to buffer the abutting force, whereby the generation of noises is further suppressed, and the magnitude of abutting noises is considerably reduced. It is noted that the spring properties of the spring 56 is shown by a curve K in FIG. 5.

The pedometer having its sensitivity adjusted in this manner is attached to a portion of the waist of a user, which is subjected to relatively stable vibration. The vibrations produced by motion such as in walking or running are sensed by the spring 56 well-balanced with respect to the weight 21 of the pendulum 22, and the pendulumn 22 reciprocates between the upper and lower limit stoppers 57 and 53 through the support shaft 14. The reciprocations are transmitted to the rachet gear 31 by the feed pawl 30 secured to the pendulumn 22 for the rotation thereof. The rotation of the gear 31 is transmitted to the display means 4 through a reduction gear mechanism comprising the worm gear 32 coaxially rotating with the gear 31 and the worm 33 meshing therewith, whereby a figure in proportion to mileage is displayed on the digital counter 42. By calculation, that figure is converted to mileage.

If the aforesaid condition is identical, that figure displayed on the counter 42 of the pedometer is then in proportion to the number of steps. Accordingly, this pedometer may be used as a pace counter. Alternatively, a specific condition is selected from the condition table 19 depending upon the sex, age, height and weight of a user, the type of motion, etc., and is aligned with the scale 18, whereby the pedometer according to the foregoing embodiment is used as an energy meter wherein a figure proportionate to the energy consumption accompanied by motion is displayed on the digital counter 42.

As mentioned above, the swinging of the pendulum for sensing the quantity of motion such as walking or running is buffered by the buffer lever, when the lower limit stopper is located above the given position and the acceleration exceeds the given value, whereby the relation between the stride and the speed of motion is corrected, and automatic switchover from walking to running and vice versa is achieved depending upon a stride. Thus, the predetermined amount of amplitude corresponding to the quantity of motion is easily and accurately balanced with respect to the spring load by using a single spring, so that the transmission of noises to the display means is prevented, said noises being produced by irregular swinging of the pendulum caused by increased acceleration. Various adjustments are achieved depending upon a wider range of conditions such as the state of motion, sex, etc. of a user with further increased accuracy.

What is claimed is:

1. In a meter for measuring the quantity of motion of a pedestrian and adapted to be worn thereby, which comprises sensor means including a pendulum for sensing vibrations, display means for displaying the swinging of said pendulum as a function of motion, and transmission means for transmitting the swinging of said pendulum to said display means, the improvement comprising a fixed upper limit stopper for said pendulum, an adjustable lower limit stopper for said pendulum, and a buffer assembly, said buffer assembly comprising an externally threaded regulating shaft rotatably supported at both ends on a fixed support, a movable member in engagement with the external thread of said shaft and adapted to reciprocate axially responsive to the rotation of said shaft, said lower limit stopper being integral with said movable member, a buffer lever rotatably mounted on said fixed support and adapted, when the acceleration acting upon said pendulum exceeds a predetermined value, to buffer the swinging of said pendulum at one end of said buffer lever, and a loop-like spring having one end secured to said pendulum and the other end secured to the other end of said buffer lever.

* * * * *